US009673851B2

(12) United States Patent
Pelster et al.

(10) Patent No.: US 9,673,851 B2
(45) Date of Patent: Jun. 6, 2017

(54) RETAINING DEVICE FOR A MOBILE COMMUNICATION DEVICE

(71) Applicant: viveroo GmbH, Salzkotten (DE)

(72) Inventors: Michael Pelster, Warstein (DE); Winfried Bueth, Salzkotten (DE); Jonas Bueth, Hannover (DE); Maximilian Christ, Schalksmuehle (DE); Sebastian Korting, Salzkotten (DE); Johanna Meyer, Hannover (DE)

(73) Assignee: viveroo GmbH, Salzkotten (DE)

( * ) Notice: Subject to any disclaimer, the term of this patent is extended or adjusted under 35 U.S.C. 154(b) by 0 days.

(21) Appl. No.: 15/056,007

(22) Filed: Feb. 29, 2016

(65) Prior Publication Data

US 2016/0211878 A1 Jul. 21, 2016

Related U.S. Application Data

(63) Continuation of application No. PCT/DE2014/100301, filed on Aug. 25, 2014.

(30) Foreign Application Priority Data

Aug. 30, 2013 (DE) .................. 10 2013 109 473

(51) Int. Cl.
*H04B 1/3888* (2015.01)
*H04M 1/04* (2006.01)
(Continued)

(52) U.S. Cl.
CPC ......... *H04B 1/3888* (2013.01); *G06F 1/1632* (2013.01); *H04M 1/04* (2013.01); *G06F 1/1626* (2013.01); *H04M 1/0297* (2013.01)

(58) Field of Classification Search
CPC .... H04B 1/3888; H04M 1/0283; H04M 1/18; H04M 1/0214
(Continued)

(56) References Cited

U.S. PATENT DOCUMENTS 4,576,252 A * 3/1986 Omata ................ E05F 3/14
16/82
8,369,082 B2 2/2013 Madonna et al.
(Continued)

FOREIGN PATENT DOCUMENTS

DE 102 13 356 C1 9/2003
DE 10 2011 000 848 A1 8/2012

*Primary Examiner* — Kamran Afshar
*Assistant Examiner* — Farid Seyedvosoghi
(74) *Attorney, Agent, or Firm* — Muncy, Geissler, Olds & Lowe, P.C.

(57) ABSTRACT

A retaining device for a mobile device having an accommodating module, into which the device can be inserted and on which a guide, support, and/or positioner for the device and a connector for electrically contacting the communication device are provided, and having a rotation module, on which the accommodating module is retained. The accommodating module can be rotated together with the rotation module about a first pivot axis from and to a first operating position and a second operating position. A housing is provided, in which the accommodating module and the rotation module are provided at least in some sections and on which the rotation module is retained. The accommodating module can be moved from an accommodating position, in which the device can be inserted into the accommodating module, to the first operating position and/or to the second operating position by rotating the accommodating module about a second pivot axis.

14 Claims, 8 Drawing Sheets

(51) Int. Cl.
*G06F 1/16* (2006.01)
*H04M 1/02* (2006.01)

(58) Field of Classification Search
USPC ......... 455/575.1, 575.2, 575.3, 575.4, 575.6,
455/575.8; 361/679.06, 679.07, 679.26;
248/346.03
See application file for complete search history.

(56) References Cited

U.S. PATENT DOCUMENTS

| | | | |
|---|---|---|---|
| 2005/0185367 A1* | 8/2005 | Chuang | G06F 1/1679 361/679.06 |
| 2009/0048007 A1* | 2/2009 | Bury | B60R 11/0241 455/575.9 |
| 2010/0073857 A1* | 3/2010 | Lin | G06F 1/1616 361/679.27 |
| 2010/0085702 A1 | 4/2010 | Liu | |
| 2012/0075789 A1* | 3/2012 | DeCamp | F16M 11/041 361/679.26 |

* cited by examiner

RETAINING DEVICE FOR A MOBILE COMMUNICATION DEVICE

This nonprovisional application is a continuation of International Application No. PCT/DE2014/100301, which was filed on Aug. 25, 2014, and which claims priority to German Patent Application No. 10 2013 109 473.2, which was filed in Germany on Aug. 30, 2013, and which are both herein incorporated by reference.

BACKGROUND OF THE INVENTION

Field of the Invention

The invention relates to a retaining device for a mobile communication device comprising an accommodating module, into which the communication device can be inserted and on which a guide, support, and/or a positioner for the communication device, on the one hand, and a connector for electrically contacting the communication device, on the other, are provided and comprising a rotation module, on which the accommodating module is retained, whereby the accommodating module can be rotated together with the rotation module about a first pivot axis from a first operating position to a second operating position and from the second operating position to the first operating position.

Description of the Background Art

Automation is being used increasingly in the home and building technology sector. Whereas a few years ago decentralized wiring of particularly electrical consumers was typical, an increasingly networked infrastructure is found today in residential buildings, in industrial buildings, and in public buildings. Central control and operating units are provided as part of this networked infrastructure. A wide range of functions can be carried out, monitored, and planned beforehand centrally via the central control and operating unit. Part of the control and operating unit in this case is typically a display by which information and operating states of individual components of the residential installation can be shown.

Moreover, operating components permit interaction. For example, operating states can be queried selectively, program routines changed, or individual consumers addressed and controlled.

Whereas such control and operating units are provided today in the majority of cases as a firmware solution by vendors of the residential installation, here as well a trend can be noted in the direction of open, multifunctional devices. For example, mobile communication devices, for example, commercially available tablet PCs, have been used in the recent past. The interaction with the installation network and the consumers provided herein then occurs, for example, via software programs, so-called apps, installed later in the mobile communication device. They allow individual operation of building technology and are provided, for example, by the manufacturer of the installation network. To assure reliable and convenient operation of the building technology via commercial communication devices as well, interfaces for the mobile communication device are provided as part of the house installation. The data communication in this case typically occurs wirelessly, for example, via WLAN. Mechanical adapters, so-called docking stations, are known for the mechanical integration of the mobile communication device. They are provided, for example, in a stationary position at an easily accessible place in the building. For example, wall-mounted mechanical adapters, which are built into walls, are known. Likewise, the mechanical adapters can be provided in wall units, doors, or other installation elements.

To be able to use the mobile communication device nevertheless in a flexible and mobile manner, it is secured only temporarily in the mechanical adapters. The mechanical adapters are designed in this respect to enable insertion of the communication device and the removal thereof. Thus, a retaining device, provided for in-wall mounting, for a mobile communication device is known from U.S. Pat. No. 8,369,082 B2. The retaining device comprises a box-shaped housing and an accommodating device, secured pivotably to the housing, for the communication device. The accommodating module can be brought into a receiving position from an operating position, in which it is provided in the housing and a communication device secured in the accommodating module can be operated from an opening provided in the housing. In the receiving position, the accommodating module is partially pivoted out of the housing and permits the insertion of the communication device. After the insertion, the accommodating module is pivoted back into the operating position. Further, a retaining device for a mobile communication device with an accommodating module for the communication device and a rotation module for pivoting the accommodating module about a horizontal pivot axis is known from DE 10 2011 000 848 A1. Because the accommodating module is rotated with the rotation module about the pivot axis, it can be taken from a first operating position, in which the display of the communication device is provided, for example, in the portrait format, to a second operating position in which the display is provided in the landscape format. The accommodating module itself in this case is only pivotable about the pivot axis of the rotation module. A separate swinging open of the accommodating module for inserting the communication device is not provided. Rather, provided on the accommodating module are longitudinally movable, tiltable clamps, which can be adjusted to the size of different communication devices and allow a positively locking securing of the communication device.

SUMMARY OF THE INVENTION

It is therefore an object of the invention to improve further the operation and securing of a wall-mountable retaining device for a mobile communication device, particularly to simplify its design, and to make it more secure.

In an exemplary embodiment, a housing is provided in which the accommodating module and the rotation module are provided at least partially and on which the rotation module is retained, and that the accommodating module can be moved from an accommodating position, in which the communication device can be inserted into the accommodating module, to the first operating position and/or to the second operating position by rotating the accommodating module about a second pivot axis.

An advantage of the invention is that the insertion of the communication device into the accommodating module is simplified. At the same time, the accommodating module and the rotation module together with the communication device inserted in the accommodating module are especially protected, because in the operating position they are located at least partially and, for example, completely in the housing. The housing can be used, for example, to enable an in-wall installation of the retaining device. The accommodating module and the rotation module are then screwed in via the housing into a flush-mount box. Likewise, the housing can be used to secure the retaining device in a recess of a wall paneling, a wall unit, a door, or the like.

In an embodiment, a retaining device is provided for a mobile communication device, the retaining device which can be built into a wall, a wall covering, a piece of furniture, or a door, this enabling the operation of the communication device in an upright or vertical first operating position and in a second operating position rotated by 90° hereto, in which the mobile communication device is oriented, for example, in the landscape format, and said retaining device in which the communication device can be inserted simply and securely into the accommodating module. The communication device, which is secured in the accommodating module, is to be provided protected in the housing both in the first and in the second operating position. The rotation module, the accommodating module, and/or the communication device retained in the accommodating module in the first operating position and in the second operating position can be provided substantially completely in the housing. To insert the communication device in the accommodating module, it is pivoted out of the housing at least partially. The communication device can then be inserted in a simple way into the accommodating module. The accommodating position in this case is not provided for the operation of the mobile communication device.

The pivoting of the communication device from the first operating position to the second operating position and back assures that a display of the communication device can be presented in both the portrait and landscape format. This is advantageous, because software applications for controlling and monitoring home technology are known whose information function visualized via the display differs depending on the orientation of the display. Thus, it can be the case that specific informational content is displayed by the software only when the display is in the landscape format. The informational content can be hidden if the display is oriented in the portrait format. The pivotable arrangement of the display and ultimately of the entire mobile communication device is therefore a requirement for being able to utilize completely the function and information components, provided by the software, of the building installation system.

According to an embodiment of the invention, a lock is provided for locking the accommodating module in the first operating position or in the second operating position. Advantageously, the two operating positions can be assumed for longer periods of time due to the locking. The operating positions can be made as exemplary positions of the retaining device. It can be provided in particular that the locking of the accommodating module in the first operating position or in the second operating position should be disengaged, before the accommodating module together with the rotation module can be rotated about the first pivot axis. The locking can occur, for example, by frictional or positive locking.

Further, a block for blocking the pivoting movement of the accommodating module about the second pivot axis can be provided. The provision of the blocking for the accommodating module can assure that an unintentional or unauthorized moving of the accommodating module into the accommodating position is thwarted. The mobile communication device, which can be inserted into the accommodating module only in the accommodating position of the module, is therefore retained securely in the accommodating module in the first operating position and in the second operating position. It can neither leave the accommodating module unintentionally nor can it be removed without authorization. This allows the use of the retaining device, for example, in public buildings, museums, hotel rooms, or the like.

It can be provided in particular that the blocking can be provided as part of a closing, which in a first closed position prevents the movement of the accommodating module into the accommodating position regardless of the operating position and enables this in a second closed position. For example, it can be provided that the movement of the accommodating module to the accommodating position is prevented via the blocking, if the accommodating module is in the second operating position (landscape format), whereas the accommodating module can be pivoted from the first operating position to the accommodating position. Advantageously, this assures that when the accommodating module pivots up, the communication device cannot slide unintentionally out of the accommodating module, for example, due to gravity, and is damaged or broken perhaps upon hitting the floor. The accommodating module can be pivoted from the first operating position to the accommodating position so that the communication device is pivoted with the upper edge out of the housing, whereas it is retained securely at the bottom in the housing. The communication device can then be removed, for example, upwards out of the accommodating module.

A movably retained locking element in particular can be provided to lock the accommodating module in the first operating position and/or in the second operating position. The locking element can be provided, for example, on the rotation module of the retaining device. In a locked position of the locking element, the pivoting movement of the accommodating module about the second pivot axis is blocked. In a release position of the locking element, this pivoting movement of the accommodating module is released. The locking element in this case functions, for example, as a locking pawl.

To actuate the locking element, an actuation element operatively connected to it can be provided. The actuation element can be moved from a basic position of the same to an opening position. In the basic position of the actuation element, the locking element is in the locking position. It can be provided that the actuation element in its basic position is not operatively connected to the locking element. In the opening position, the actuation element acts on the locking element such that the locking element is in its release position and the pivoting movement about the second pivot axis is released.

The actuation element can be made, for example, as a pressure actuation element. The locking element is then actuated if the actuation element is moved by a, for example, linear pressure actuation from the basic position to the opening position.

According to an embodiment, at least one spring-damping device can be provided on the retaining device. A smooth, automatic closing actuating movement during the execution of the rotational movement about the first pivot axis or about the second pivot axis is realized via the spring-damping device. A spring element of the spring-damping device in this case ensures that the pivoting movement due to a spring force, acting in the pivoting movement direction, occurs automatically shortly before the target position is reached. The damping element of the spring-damping device acts against the closing movement shortly before the target position is reached and is dimensioned so that the pivoting process occurs with a reduced velocity. On the one hand, a greater operating convenience can be achieved by the provision of the spring-damping device. On the other hand, it is assured that the mobile communication device during the pivoting of the accommodating module is protected from impacts or high acceleration forces.

For example, a first spring-damping device can be provided to realize automatically and at the same time smoothly the movement of the accommodating module to the accommodating position. The spring element and the damping element of said first spring-damping device are then, for example, provided between the accommodating module and the rotation module retaining the accommodating module. At least one further spring-damping device can be provided to make the pivoting movement from the first operating position to the second operating position or vice versa smooth and automatic.

The housing of the retaining device is, for example, formed in the shape of a tray with a back base plate, with at least one sidewall projecting substantially perpendicular at the edge from the base plate and with an opening surrounded at least partially by the sidewall and formed on a front side opposite the base plate. It can be provided in particular that the housing has a circular basic shape and a collar for securing the retaining device is provided on the sidewall. In the area of the base plate, the sidewall, or the collar, boring holes can be provided by which the retaining device can be secured to, particularly screwed into, a flush-mount box, a cladding body, or a wall element. The housing to improve its protective and support function can be produced or cast out of a robust material, for example, steel. In particular in the area of the sidewall of the housing, a slotted guide system can be provided by which the rotation module or a spring-damping device is guided during the pivoting of the rotation module about the first pivot axis.

According to an embodiment of the invention, a sealing body overlapping the opening of the housing can be provided on the rotation module and held rotatable about the first pivot axis relative to the housing. The sealing body in the area of the accommodating module has a recess, which is specified in size and position so that the display or a control element of the communication device can be accessed, operated, or seen through the recess at least partially. The sealing body, for example, has a substantially flat outer surface side facing away from the housing or the base plate. In the installed state of the communication device, a substantially flat control or display top side of the communication device is provided substantially flush with the outer surface side of the sealing body or set back relative to it in the direction of the base plate of the housing. The sealing body can be made with respect to its optics, its haptics, or material out of a similar or the same material as a display of the communication device.

To simplify the rotation movement about the first pivot axis (moving the accommodating module from the first operating position to the second operating position or back), a handle can be provided or an actuation depression is formed at least temporarily. For example, the actuation element can be moved into an intermediate position between the basic position and the opening position of the same, whereby the actuation element is provided in a second recess of the sealing body such that an actuation surface of the actuation element in the basic position is provided substantially flush with the outer surface side of the sealing body and that the actuation surface of the actuation element in the intermediate position is provided set back in the direction of the housing toward the outer surface side. The recessed grip is formed temporarily by the set-back orientation of the actuation surface in the intermediate position.

Further scope of applicability of the present invention will become apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
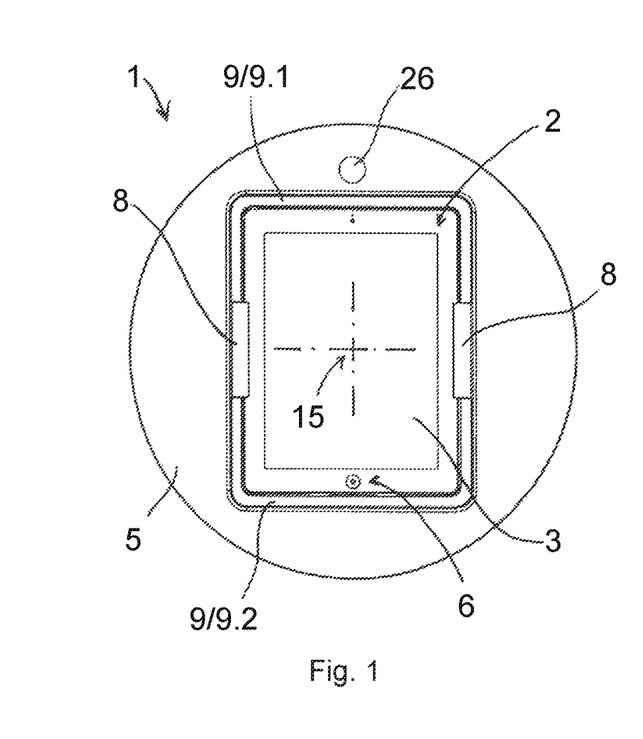
FIG. 1 shows a top view of the retaining device of the invention in a first operating position.
Figure 2:
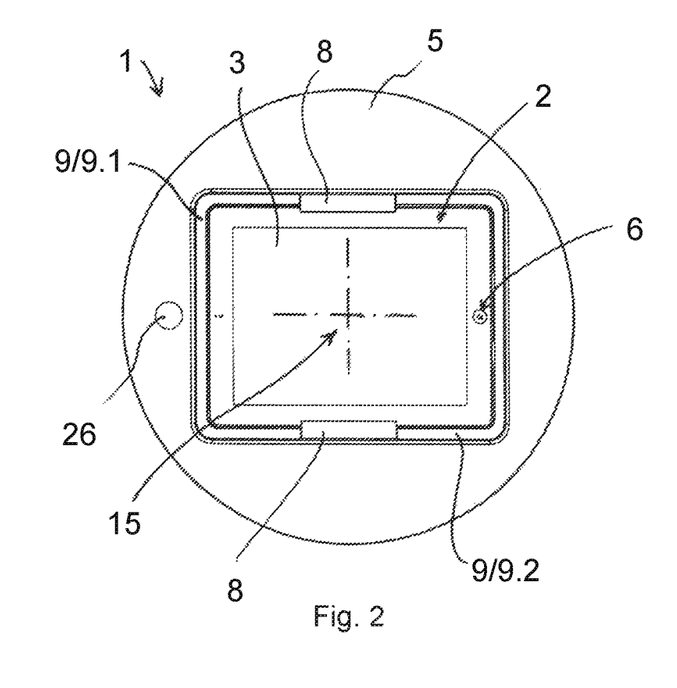
FIG. 2 shows a top view of the retaining device according to FIG. 1 in a second operating position.

FIG. 1 shows a view of a retaining device 1 of the invention with a mobile communication device 2, secured thereto, in a first operating position. Mobile communication device 2 for showing the content and for visualizing control elements comprises a substantially rectangular display 3, which in the illustrated first operating position is provided in the portrait format. The same retaining device 1 with the same communication device 2 is shown according to FIG. 2 in a second operating position. In this case, communication device 2 is disposed pivoted by 90° counterclockwise in order to use display 3 in the landscape format. A front side, having display 3, of mobile communication device 2 is arranged in retaining device 1 in a recess 4 of a sealing body 5 of retaining device 1 such that display 3 is visible via recess 4 and control elements of communication device 2, for example, a central control button 6, or control interfaces displayed on display 3 are accessible. As is clear particularly from the perspective side view according to FIG. 3, an outer surface side 7 of sealing body 5 and a top side of display 3 are arranged substantially parallel, whereby the top side of display 3 is provided set back relative to outer surface side 7 of sealing body 5 and protected thereby.

Figure 3:
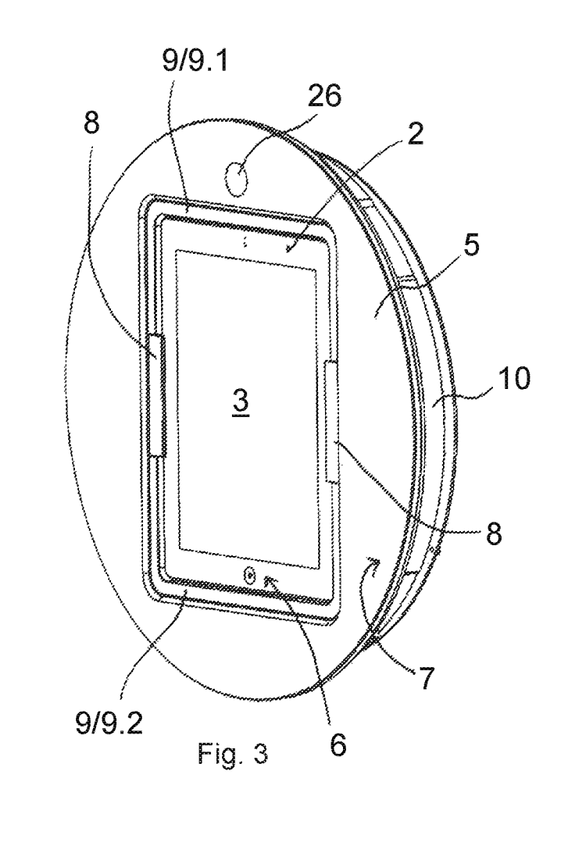
FIG. 3 shows a perspective side view of the retaining device according to FIG. 1 in the first operating position.

Communication device 2 is secured in retaining device 1 via side guide rails 8. At the edges, mobile communication device 2 is surrounded by a flexible, particularly rubber-elastic body 9. Rubber-elastic body 9 is installed in recess 4 between mobile communication device 2, on the one side, and sealing body 5, on the other. It can be made as a single-piece rubber-elastic body 9 or, as shown, be made of multiple parts. In the present case, two substantially U-shaped profile bodies 9.1, 9.2 are realized, which join both sides of guide rails 8 on the front.

Retaining device 1 is used, for example, for immovably installing mobile communication device 2 provided for controlling a house on a wall, a piece of furniture, or some other built-in device in a building. For example, retaining device 1 can be provided concealed at least partially in a recess of the wall or furniture. In particular, an in-wall installation can be provided, whereby retaining device 1 is secured in a wall-mounted flush-mount box (not shown). For this purpose, particularly a housing 10 of retaining device 1 is screwed together with the flush-mount box. After retaining device 1 is secured, for example, outer surface side 7 can be provided flush with the wall. It is also conceivable that thin sealing body 5 of retaining device 1 is provided raised to the wall, whereas housing 10 is built substantially completely recessed in the wall.

Figure 4:
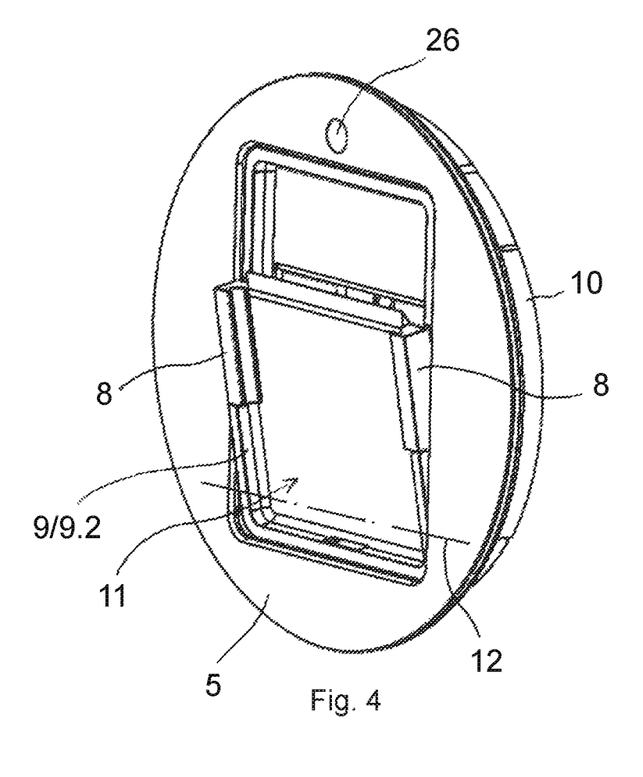
FIG. 4 shows a perspective side view of the retaining device in an accommodating position.

To insert communication device 2 in retaining device 1, an accommodating module 11 of retaining device 1 can be brought into an accommodating position; compare FIG. 4. In this case, accommodating module 11 is pivoted out about a second pivot axis 12 at least partially through recess 4, so that communication device 2 can be inserted in guide rails 8 from above or removed from them. In addition, an electrical contact plug 13, which is used for contacting communication device 2 and by which communication device 2 is supplied with current in particular, is provided in accommodating module 11.

Figure 5:
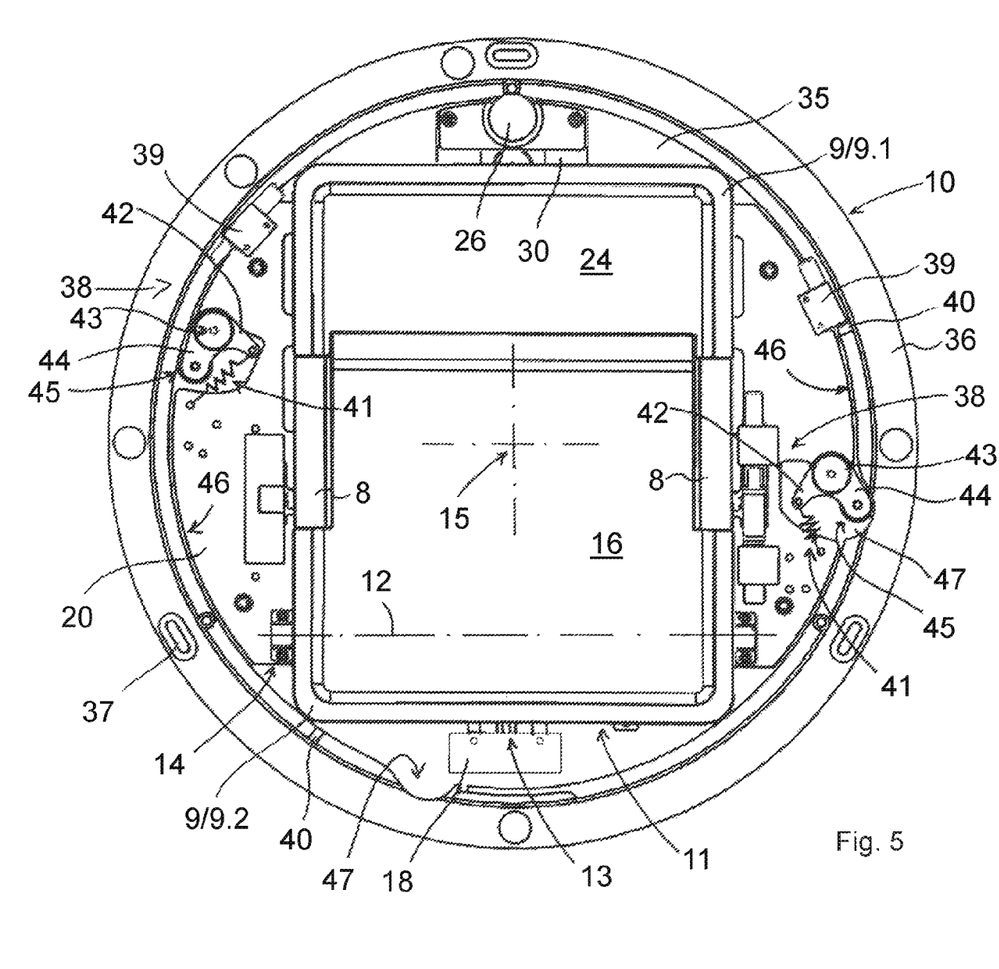
FIG. 5 shows a top view of the retaining device according to FIG. 1 without a sealing body.
Figure 6:
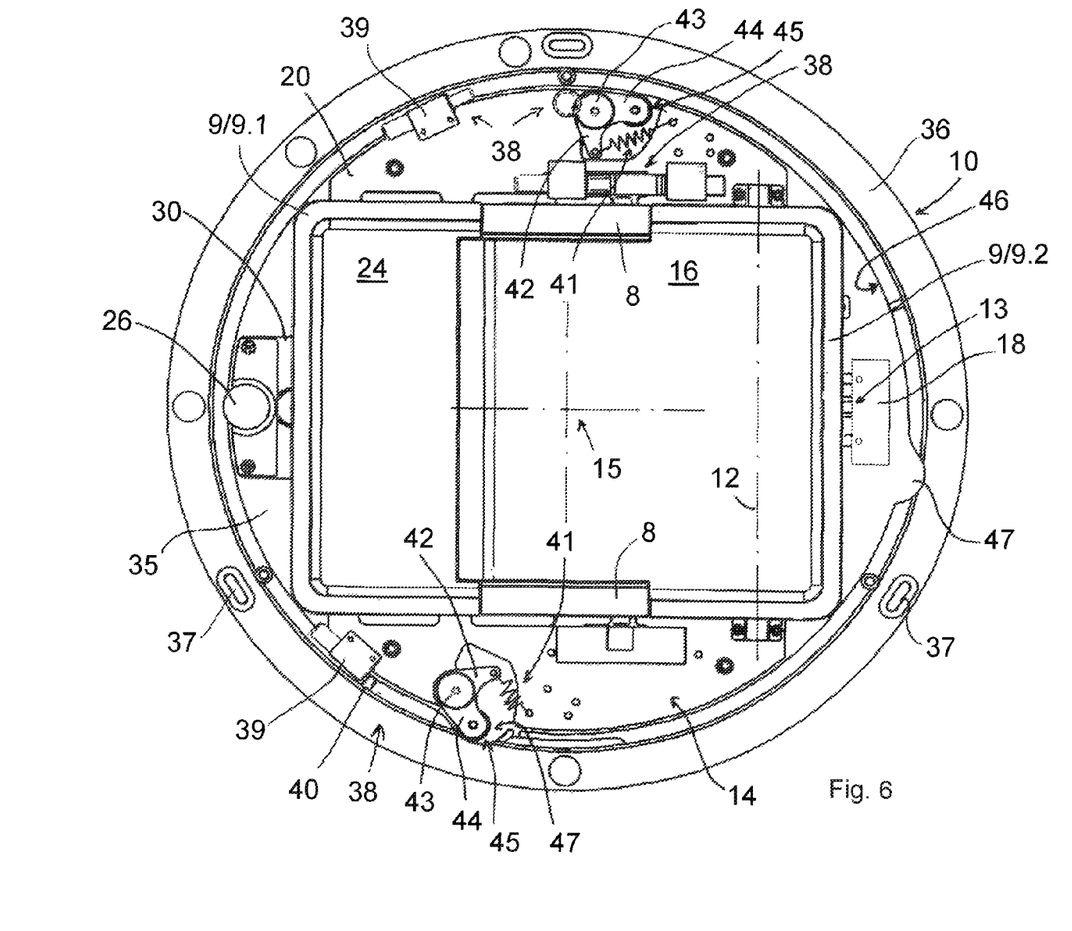
FIG. 6 shows a top view of the retaining device according to FIG. 1 without a sealing body in the second operating position.

As shown in detail in FIGS. 5 and 6, accommodating module 11 is secured to a rotation module 14. Rotation module 14 can be rotated in regard to housing 10 together with accommodating module 11 about first pivot axis 15 to move retaining device 1 into the first operating position or into the second operating position. First pivot axis 15 is provided hereby substantially pivoted by 90° to the second pivot axis 12. In the wall-mounted state of retaining device 1, both axes 12, 15 are, for example, oriented horizontally.

Accommodating module 11 retained rotatable about second pivot axis 12 comprises as essential components a back support plate 16, guiding rails 8 secured spaced apart to support plate 16, contact plug 13 and a retaining element 17 for contact plug 13, a circuit support 18, connected to contact plug 13, with electronic components (not shown) secured hereto, two retaining pins 19 provided on opposite sides of support plate 16, and rubber-elastic U-shaped body 9.2. Retaining pins 19 are provided aligned with second pivot axis 12 and are used to support accommodating module 11 on rotation module 14.

Figure 7:
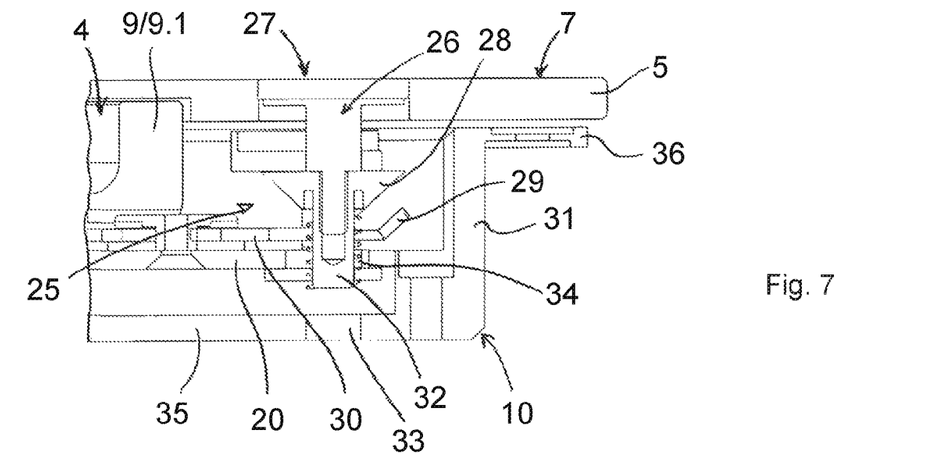
FIG. 7 shows a partial section through the retaining device according to FIG. 1 with an actuation element in a basic position.
Figure 8:
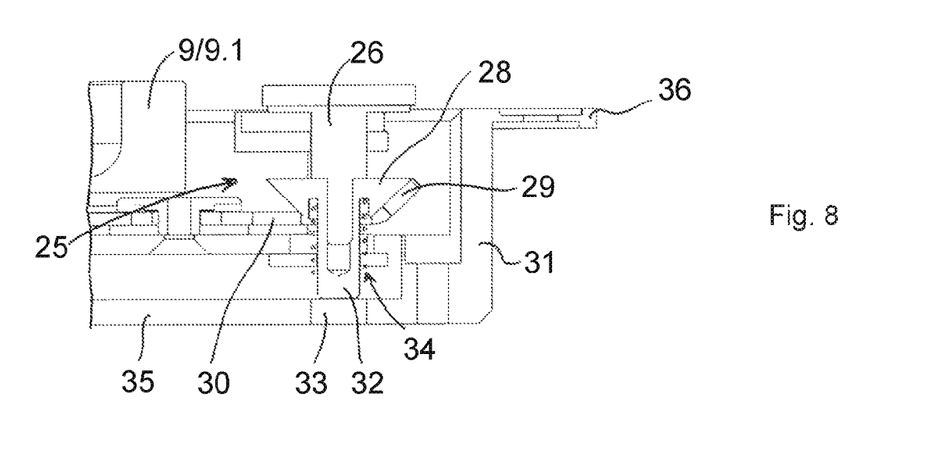
FIG. 8 shows the partial section according to FIG. 7 with the actuation element in an intermediate position.

Rotation module 14 comprises as essential components a rotation plate 20, two retaining blocks 21, secured hereto, for receiving retaining pins 19 of accommodating module 11, linear guiding components 22 for a slide body 23, and a support plate 24 for communication device 2 and rubber-elastic U-shaped body 9.1. An actuation device 25, which is shown in detail in FIGS. 7 to 10, is provided moreover on rotation module 14. Actuation device 25 comprises an actuation element 26, which is formed button-like in the manner of a pressure actuation element 26 and has a substantially flat actuation surface 27. Actuation element 26 can be lowered linearly from a basic position of the same, as shown in FIG. 7, in which actuation surface 27 is provided substantially flush with outer surface side 7 of sealing body 5. Via the linear lowering, a cone-shaped molded part 28 of actuation element 26 comes into contact with an angled section 29 of a longitudinally movable locking element 30, retained on rotation plate 20 of rotation module 14. The thus achieved position of actuation element 26 defines an intermediate position of the same. Due to a further lowering of actuation element 26, locking element 30 is moved in the direction of a sidewall 31 of housing 10. A cylindrical pin 32 of actuation element 26 hereby enters a release recess 33 provided on housing 10. According to FIG. 9, actuation element 26 reaches an opening position. In the opening position, locking element 30 is moved so far in the direction of sidewall 31 of housing 10 that a locking of accommodating module 11 in the first operating position is cancelled and accommodating module 11 can pivot into the accommodating position.

Figure 9:
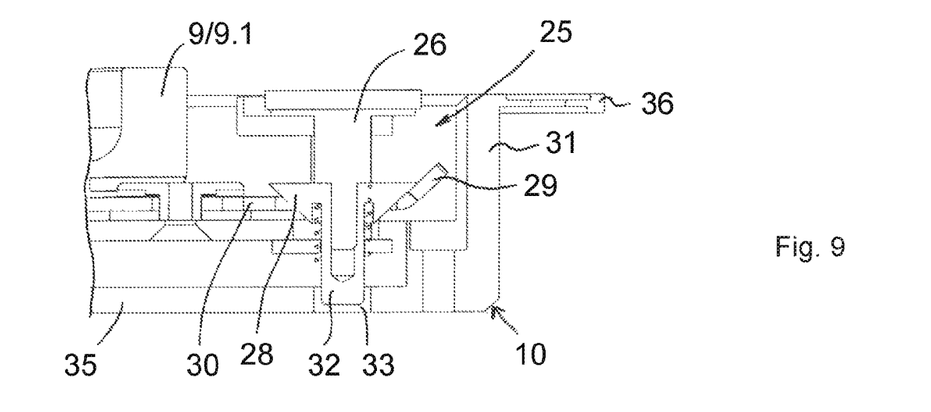
FIG. 9 shows the partial section according to FIG. 7 with the actuation element in the opening position.

Locking element 30 is therefore moved via the operating element from a locking position to a release position. The linear actuating movement of actuation element 26 is hereby converted by cone-shaped molded section 28 and angled section 29 into a linear movement, rotated by 90°, of locking element 30. The linear movement of locking element 30 is defined in terms of the path by an angle of contact formed between cone-shaped molded section 28 and angled section 29.

Force is applied to actuation element 26 via a return spring 34. Return spring 34 is pretensioned so that the basic position describes an exemplary position of actuation element 26. Actuation element 26 by spring actuation automatically returns to the basic position both from the intermediate position according to FIG. 8 and from the opening position according to FIG. 9. If actuation element 26 coming out of the opening position passes beyond the intermediate position and is moved farther in the direction of the basic position, locking element 30 also actuated by the spring force (spring is not shown) returns from the release position to the locking position.

Housing 10 of retaining device 1 comprises a base plate 35, formed substantially flat, and sidewall 31, projecting at the edges from base plate 35. As a result, housing 10 obtains a tray-shaped structure. An opening surrounded by sidewall 31 is provided on a front side of housing 10, said side being opposite to base plate 35. A circumferential collar 36 projects radially in the area of the opening from sidewall 31. A plurality of recesses 37 distributed radially on collar 36 are provided for securing housing 10. Further recesses for securing housing 10 are provided in the area of base plate 35 or sidewall 31.

Figure 10:
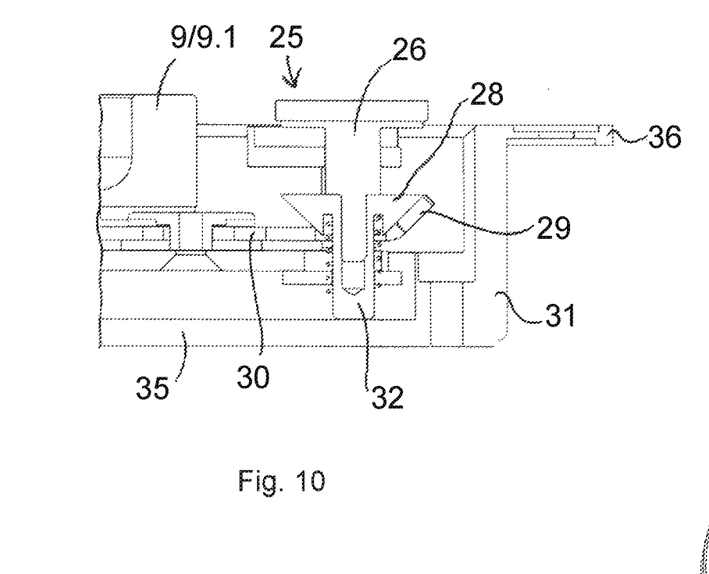
FIG. 10 shows a detail illustration of the retaining device according to FIG. 2 with the actuation element in the intermediate position.

FIG. 10 shows a partial section through retaining device 1 in the second operating position thereof with actuation element 26 in the intermediate position. Because release recess 33 is not made in base plate 35 of housing 10, actuation element 26 cannot be shifted past the intermediate position in the direction of the opening position. A longitudinal shifting of locking element 30 and thereby a release of the locking of accommodating module 11 are prevented. Accommodating module 11 can therefore not be pivoted from the second operating position directly into the accommodating position.

Figure 11:
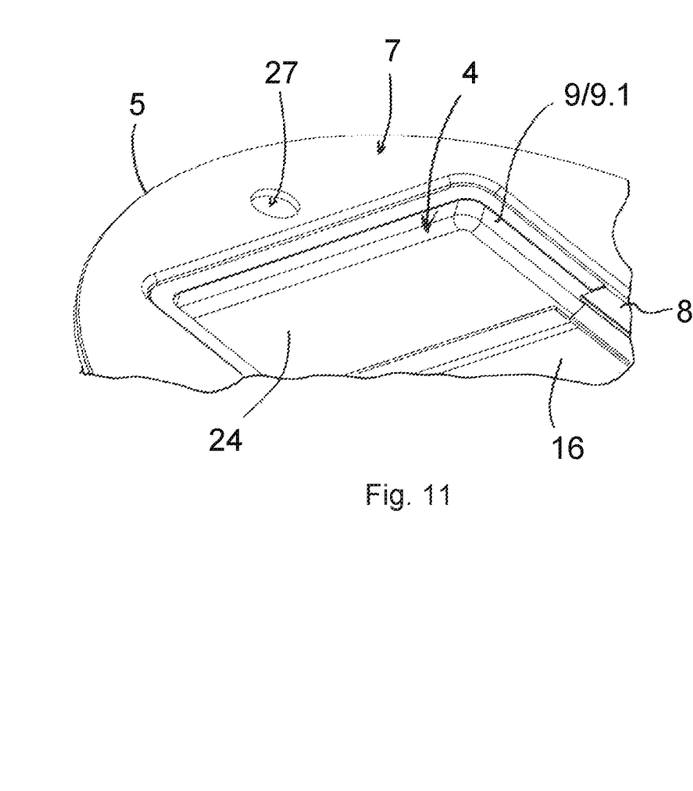
FIG. 11 shows a partial perspective view of the retaining device with the actuation element in the intermediate position.

It is shown in FIG. 11 how a recessed grip is formed by lowering actuation element 26 in the area of the same. Providing the recessed grip makes it possible to move retaining device 1 in simple way from the first operating position to the second operating position or from the second operating position to the first operating position. An unintentional moving of actuation element 26 to the opening position is thereby prevented in two ways. On the one hand, closed base plate 35 of housing 10 prevents the unlocking of accommodating module 11 in the second operating position as in pivoting. On the other hand, due to the creation of the operative connection between actuation element 26 and locking element 30 in the intermediate position in the first operating position of retaining device 1 as well due to the additional actuation force to be applied, a pressure point arises, which makes the overshooting of the intermediate position clearly evident to the user. An inadvertent unlocking of accommodating module 11 is prevented hereby.

Two spring-damping devices 38 are provided on rotation plate 20 of rotation module 14. The spring-damping devices 38 are used to realize a smooth and at the same time automatic closing actuating movement during the rotation of rotation module 14 and of accommodating module 11 secured hereto about first pivot axis 15. A damping element 39 of spring-damping device 38 is used hereby to realize a smooth movement immediately before the first operating position or the second operating position is reached. As soon as damping element 39 enters into an operative connection with a stop 40, which is provided for this on housing 10, the damping acts against the rotation movement. In addition, a spring element 41 is provided. Spring element 41 is secured to rotation plate 20, on the one hand, and a first leg 42 of an L-shaped angle lever 43. A guide wheel 45 is provided on a second leg 44 of angle lever 43. Spring-damping device 38 with guide wheel 45 rests against a slotted guide system 46, which is formed in the area of sidewall 31 of housing 10. Two trough-shaped forms 47, which indicate the two operating positions in regard to guide wheel 45 of spring-damping devices 38, are provided in this case on slotted guide system 46. If second leg 44 of angle lever 43 enters the operating area of trough-shaped formations 47, the tensioned spring element 41 can relax. Due to the relaxation of spring element 41, the rotation body will automatically reach the first operating position or the second operating position.

Figure 12:
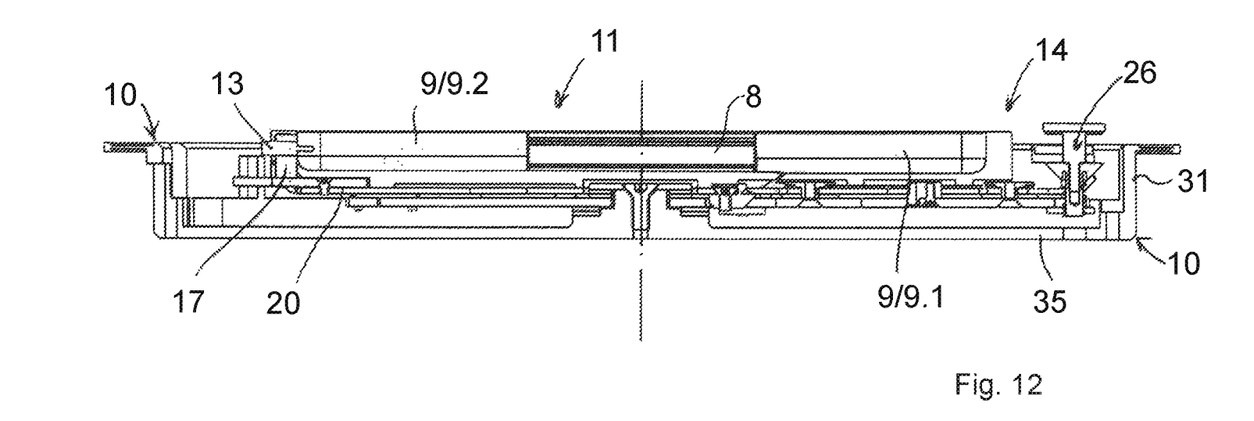
FIG. 12 shows a sectional illustration of the retaining device in the first operating position.
Figure 13:
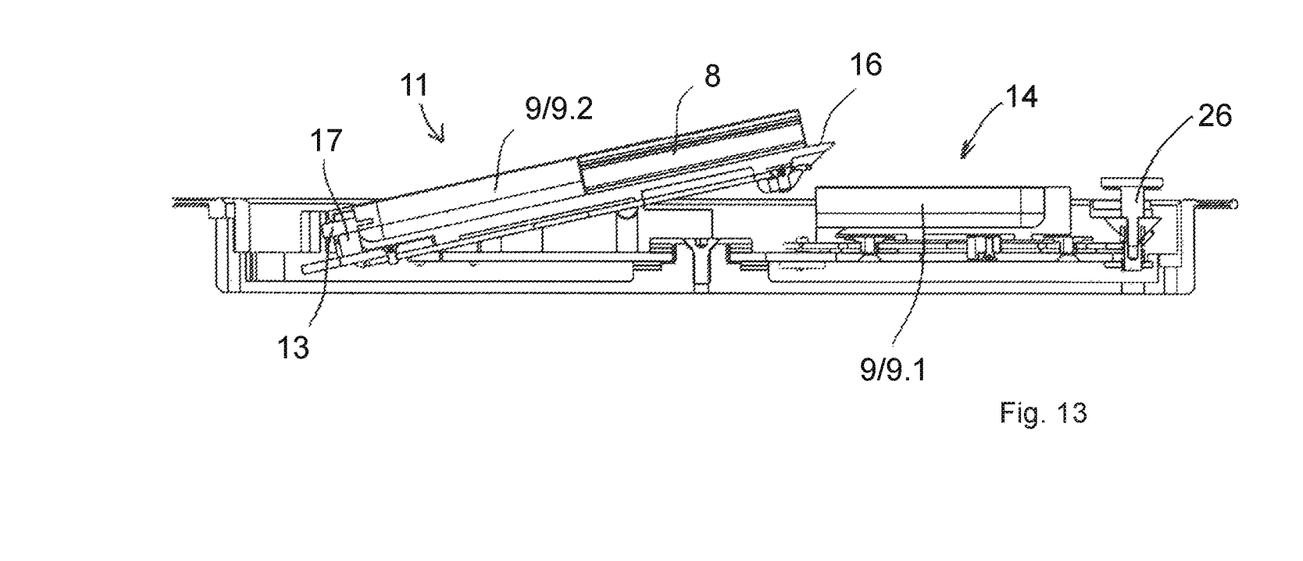
FIG. 13 shows a sectional illustration of the retaining device with the accommodating module in the accommodating position.

FIGS. 12 and 13 show a sectional illustration through retaining device 1. Whereas accommodating module 11 according to FIG. 12 is provided in the first operating position substantially in housing 10, in the accommodating position according to FIG. 13 it is provided rotated about second pivot axis 12. Communication device 2 (not shown) can in the accommodating position can be pushed into accommodating module 11 or removed from it.

Figure 14:
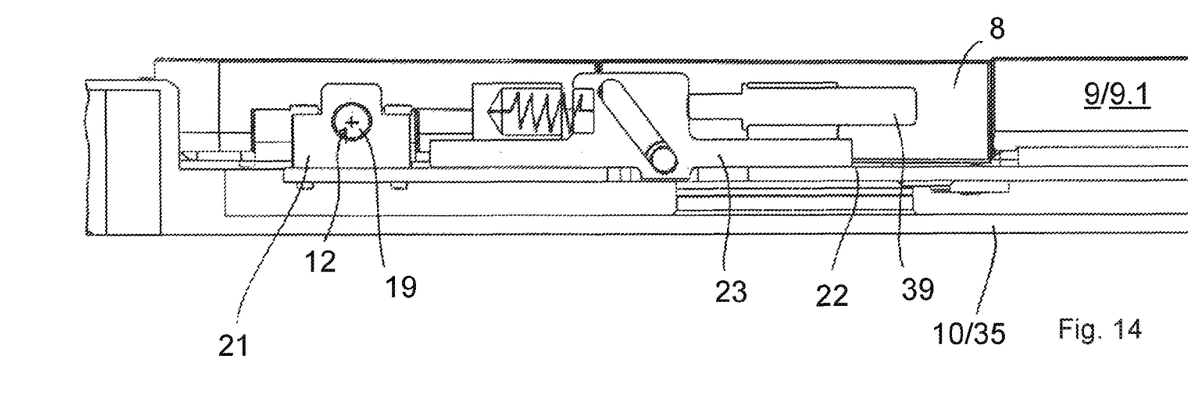
FIG. 14 shows a partial sectional illustration of the retaining device with a detailed illustrated of a spring-damping device in the first operating position.
Figure 15:
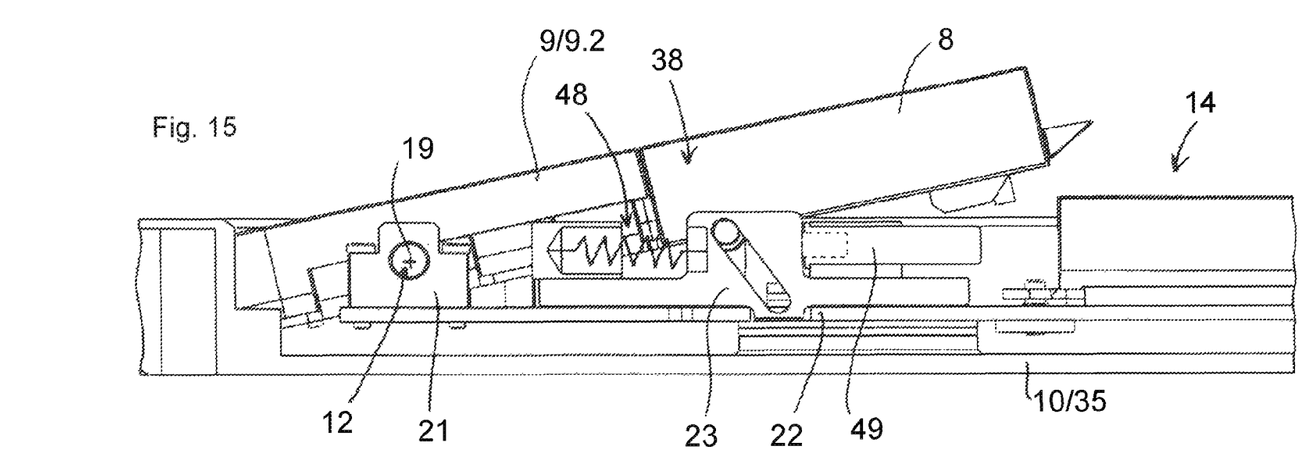
FIG. 15 shows the partial sectional illustration according to FIG. 14 with the spring-damping device in the accommodating position.

As shown in FIGS. 14 and 15, a spring-damping device 38 is also provided for realizing the second pivoting movement about second pivot axis 12. As soon as locking element 30 moves in the direction of the release position and the locking of accommodating module 11 is released, a spring element 48 relaxes. Accommodating module 11 pivots automatically to the accommodating position by the relaxation of spring element 48. In addition, here as well, a damping element 49 is provided, which is engaged before the accommodating position is reached and allows a smooth closing actuating movement.

Because retaining device 1 will be used for a long time period particularly in a concealed installation, and it can be assumed particularly due to the relatively short periods of use of modern communication devices 2 that a plurality of different communication device 2 will be used over the lifetime of retaining device 1, measures are taken to adapt retaining device 1 to the particular communication device 2. In particular accommodating module 11 is made completely modular. For example, guiding rails 8 are secured detachably to support plate 16. If the geometric dimensions or contours change during the replacement of communication device 2, new guide rails 8 can be installed. For example, contact plug 13 can be replaced separately or together with retaining element 17. Similarly, replacement of circuit support 18 is also provided. Depending on the change in geometry, moreover, rubber-elastic body 9.2 or support plate 16 can be replaced in addition.

Apart from accommodating module 11, other components of retaining device 1 are also made to be replaceable. For example, support plate 24 and rubber-elastic body 9.1, which is provided on support plate 24, are replaced to adapt retaining device 1 to the geometry of communication device 2. Likewise, sealing body 5 can be replaced if the geometry of new communication device 2 differs significantly from the previous geometry and if recess 4 has to be adapted.

The same components and component functions are labeled by the same reference characters.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A retaining device for a mobile communication device comprising:
   an accommodating module into which the communication device is insertable, the accommodating module having a guide, a supporting element, and/or positioner for the communication device, the accommodating module having a connector for electrically contacting the communication device;
   a rotation module on which the accommodating module is retained, the accommodating module being adapted to be rotated together with the rotation module about a first pivot axis from a first operating position to a second operating position and from the second operating position to the first operating position;
   a housing in which the accommodating module and the rotation module are provided at least partially and on which the rotation module is retained, wherein the accommodating module is moveable from an accommodating position, in which the communication device is insertable into the accommodating module, to the first operating position and/or to the second operating position by pivoting the accommodating module about a second pivot axis,
   wherein a locking element for locking the accommodating module in the first operating position and/or the second operating position is provided,
   wherein when the locking element is in a locked position, the locking element blocks a pivoting movement of the accommodating module about the second pivot axis, such that the accommodating module is blocked from moving from the first operating position and/or the second operating position into the accommodating position;

wherein an actuation element operatively connectable to the locking element is moveable from a basic position to an opening position, wherein the pivoting movement of the accommodating module about the second pivot axis is blocked in the basic position of the actuation element and wherein, in the opening position of the actuation element, the locking element, operatively connected to the actuation element, is provided in the release position;

wherein the housing is formed in a shape of a tray with a back base plate, with at least one sidewall projecting substantially perpendicular at an edge from the back base plate and with an opening surrounded at least partially by the sidewall and formed on a front side opposite the back base plate, wherein a sealing body overlapping the opening of the housing, securable to the rotation module, and held rotatable about the first pivot axis relative to the housing is provided with a recess provided in an area of the accommodating module, wherein the sealing body has a substantially flat outer surface side facing away from the housing, and wherein a relative position of the accommodating module provided in the housing in the first operating position and/or in the second operating position to the sealing body and the outer surface side is determined so that a flat control and/or display top side of the communication device retained in the accommodating module is provided substantially parallel and/or flush with the outer surface side of the sealing body and/or is provided set back to the outer surface side, and wherein the communication device is positioned such that the control and/or display top side are provided in the area of the recess and are accessible and/or visible at least partially, and wherein the actuation element is formed as a pressure actuation element, wherein an actuation of the locking element is effected by a linear pressure actuation of the actuation element, and/or wherein the actuation element has a substantially flat or convexly or concavely curved actuation surface and is movable to an intermediate position formed between the basic position and the opening position, wherein the actuation element is provided in a second recess of the sealing body such that the actuation surface of the actuation element in the basic position is provided substantially flush with an outer surface side of the sealing body and such that the actuation surface of the actuation element in the intermediate position is provided set back in the direction of the housing to the outer surface side as a result of which the recessed grip is formed temporarily.

2. The retaining device according to claim 1, wherein in a release position of the locking element, the pivoting movement of the accommodating module about the second pivot axis is released.

3. The retaining device according to claim 1, wherein at least one spring-damping device is provided for realizing an automatic and smooth closing actuating movement in the execution of the rotation about the first pivot axis and/or about the second pivot axis.

4. The retaining device according to claim 1, wherein a first spring-damping device is provided, which is operatively connected to the rotation module and the accommodating module such that the first spring-damping device for realizing an automatic and smooth closing actuating movement during movement of the accommodating module to the accommodating position is engaged, and wherein at least one further spring-damping device is provided, which is operatively connected to the rotation module and to the housing or a construction unit connected immovably to the housing, such that the further spring-damping device to realize an automatic and smooth closing actuating movement during movement of the rotation module is engaged in the first operating position and/or in the second operating position.

5. The retaining device according to claim 4, wherein the housing is formed in a shape of a tray with a back base plate, with at least one sidewall projecting substantially perpendicular at an edge from the back base plate and with an opening surrounded at least partially by the sidewall and formed on a front side opposite the back base plate.

6. The retaining device according to claim 5, wherein on the inner side of the sidewall, a slotted guide system is provided by which the rotation module and/or the further spring-damping device are guided during the pivoting of the rotation module and of the accommodating module about the first pivot axis.

7. The retaining device according to claim 1, wherein the accommodating module is pivoted out of the housing at least partially in the accommodating position.

8. The retaining device according to claim 1, wherein the first pivot axis is provided offset by an angle of 90° to the second pivot axis.

9. The retaining device according to claim 1,
wherein the housing is formed in a shape of a tray with a back base plate, with at least one sidewall projecting substantially perpendicular at an edge from the back base plate and with an opening surrounded at least partially by the sidewall and formed on a front side opposite the back base plate, and wherein a sealing body overlapping the opening of the housing, securable to the rotation module, and held rotatable about the first pivot axis relative to the housing is provided with a recess provided in an area of the accommodating module, wherein the sealing body has a substantially flat outer surface side facing away from the housing, and wherein a relative position of the accommodating module provided in the housing in the first operating position and/or in the second operating position to the sealing body and the outer surface side is determined so that a flat control and/or display top side of the communication device retained in the accommodating module is provided substantially parallel and/or flush with the outer surface side of the sealing body and/or is provided set back to the outer surface side, and wherein the communication device is positioned such that the control and/or display top side are provided in the area of the recess and are accessible and/or visible at least partially.

10. The retaining device according to claim 1, wherein, to carry out a rotation movement about the first pivot axis, a handle is provided and/or an actuation depression is formed at least temporarily.

11. The retaining device according to claim 1: wherein the housing is formed in a shape of a tray with a back base plate, with at least one sidewall projecting substantially perpendicular at an edge from the back base plate and with an opening surrounded at least partially by the sidewall and formed on a front side opposite the back base plate, and wherein a release recess is provided on the back base plate of the housing such that the actuation element in the opening position of the same engages at least partially in the release recess of the housing, if the rotation module and the accommodating module, secured hereto, are provided in the first operating position.

12. The retaining device according to claim 1: wherein the actuation element is moveable between the basic position, an intermediate position and the opening position.

13. The retaining device according to claim 1: wherein the actuation element is connected to the locking element, such that a linear movement of the actuation element provides a linear movement of the locking element, and wherein a direction of the linear movement of the actuation element is perpendicular to a direction of the linear movement of the locking element.

14. The retaining device according to claim 1: wherein the housing is formed in a shape of a tray with a back base plate, with at least one sidewall projecting substantially perpendicular at an edge from the back base plate and with an opening surrounded at least partially by the sidewall and formed on a front side opposite the back base plate, wherein a sealing body overlapping the opening of the housing, securable to the rotation module, and held rotatable about the first pivot axis relative to the housing is provided with a recess provided in an area of the accommodating module, wherein the sealing body has a substantially flat outer surface side facing away from the housing, and wherein a relative position of the accommodating module provided in the housing in the first operating position and/or in the second operating position to the sealing body and the outer surface side is determined so that a flat control and/or display top side of the communication device retained in the accommodating module is provided substantially parallel and/or flush with the outer surface side of the sealing body and/or is provided set back to the outer surface side, and wherein the communication device is positioned such that the control and/or display top side are provided in the area of the recess and are accessible and/or visible at least partially, and wherein the actuation element has a substantially flat or convexly or concavely curved actuation surface and is movable to an intermediate position formed between the basic position and the opening position, wherein the actuation element is provided in a second recess of the sealing body such that the actuation surface of the actuation element in the basic position is provided substantially flush with an outer surface side of the sealing body and such that the actuation surface of the actuation element in the intermediate position is provided set back in the direction of the housing to the outer surface side.

* * * * *